United States Patent [19]
Kato et al.

[11] Patent Number: 5,564,493
[45] Date of Patent: Oct. 15, 1996

[54] AUTOMOTIVE AIR CONDITIONING DEVICE

[75] Inventors: Keno Kato; Ikutaro Noji, both of Yokohama; Masashi Arai; Makoto Fukubayashi, both of Isehara, all of Japan

[73] Assignee: Nissan Motor Co., Ltd., Yokohama, Japan

[21] Appl. No.: 356,023

[22] Filed: Dec. 14, 1994

[30] Foreign Application Priority Data

Dec. 22, 1993 [JP] Japan ................... 5-325017

[51] Int. Cl.$^6$ ........................... F25B 29/00
[52] U.S. Cl. ........................... 165/263; 236/91 F
[58] Field of Search .................. 165/30, 42, 43; 236/91 C, 91 F

[56] References Cited

U.S. PATENT DOCUMENTS

| | | | |
|---|---|---|---|
| 4,829,884 | 5/1989 | Kagohata | 165/43 |
| 5,176,201 | 1/1993 | Yamamoto | 165/43 |
| 5,186,682 | 2/1993 | Iida | 236/91 C |
| 5,293,928 | 3/1994 | Iida et al. | 236/91 F |

FOREIGN PATENT DOCUMENTS

| | | |
|---|---|---|
| 57-7714 | 1/1982 | Japan . |
| 4043118 | 2/1992 | Japan ................... 165/41 |
| 6087319 | 3/1994 | Japan ................... 236/91 C |

*Primary Examiner*—F. Daniel Lopez
*Assistant Examiner*—Mark Sgantzos
*Attorney, Agent, or Firm*—Lowe, Price, LeBlanc & Becker

[57] ABSTRACT

A control system for an automotive air conditioner has an ambient air temperature sensor; a solar radiation quantity sensor; a passenger room temperature sensor; a cooled air temperature sensor; an air-mix door open degree sensor; and a bypass door open degree sensor. The control system further has a first device which, based on information from the ambient air temperature sensor and the solar radiation quantity sensor, derives a first target temperature of air drawn out from an air outlet structure; a second device which, based on the information from the cooled air temperature sensor and the air-mix door open degree sensor, derives a second target temperature of air drawn out from a foot area air duct; and a third device which, based on the information from the cooled air temperature sensor, the first target temperature and the second target temperature, derives a ratio between the amount of air flowing in a bypass passage and that of air blown out from the air outlet structure; and a fourth device which controls the open degree of the bypass door in accordance with the derived ratio.

8 Claims, 13 Drawing Sheets

AUTOMOTIVE AIR CONDITIONING DEVICE

BACKGROUND OF THE INVENTION

1. Field of the Invention

The present invention relates in general to air conditioning devices, and more particularly to automotive air conditioning devices of a type having a passage structure through which cooled air bypassing a heater core can be blown into a passenger room or blown against a windshield to defrost the same.

2. Background of the Related Art

In order to clarify the task of the present invention, one conventional automotive air conditioning device as shown in FIG. 16 of the accompanying drawings will be outlined, which is disclosed in Japanese Patent First Provisional Publication 57-7714.

In the drawing, denoted by numeral 1 is a dust structure of an air conditioner device, which has at its upstream portion two inlet passages 13 and 14. The passage 13 leads to the outside of the vehicle, while the other passage 14 leads to the passenger compartment. An air intake door 15 is pivotally connected to the duct structure 1, which selectively closes and opens the two passages 13 and 14. Within the duct structure 1, there are installed an electric blower fan 2, an evaporator 3, a heater core 4 and an air-mix door 5. A bypass passage 6 is provided which bypasses the heater core 4. The duct structure 1 is formed with an air outlet structure 7 which has a center air vent 7C, a left air vent 7L and a right air bent 7R. The duct structure 1 further has a foot area air duct 11. The air vents 7C, 7L and 7R of the air outlet structure 7 are directed to a vertically middle portion of the passenger compartment, while the foot area air duct 11 is directed to a lower portion of the compartment. Designated by numeral 8 is a vent door which pivots to control air flowing toward the air outlet structure 7 and designated by numeral 12 is a foot door which pivots to control air flowing toward the foot area air duct 11. As shown, a major passage 9 is defined between the vent door 8 and the air outlet structure 7.

The bypass passage 6 extends from the duct structure 1 just downstream of the evaporator 3 to the major passage 9 just upstream of the air outlet structure 7. The bypass passage 6 has a bypass door 10 pivotally installed therein.

The doors 15, 5, 8, 10 and 12 are moved by respective actuators (not shown) which are controlled by a control unit to which information signals are fed from various sensors including temperature sensors, door angular sensors and a solar radiation quantity sensor. The temperature sensors are mounted on the ceiling and the floor of the vehicle. The temperature difference between the upper and lower portions of the passenger compartment is thus sensed. That is, when, under a Bi-Level blow mode kept selected, a larger temperature difference is sensed, the bypass door 10 is opened. In this case, air which has passed through the air-mix door 5, that is, the mixed air consisting of the air "A" heated by the heater core 4 and the air "B" not heated by the heater core 4 is blown to the foot area of the passenger compartment through the foot area air duct 11, and at the same time, air, that is, the mixed air consisting of the mixed air "A" and "B" which have passed through the air-mix door 5 and the air "C" which has passed through the bypass passage 6 is blown to the vertically middle portion of the passenger compartment through the air outlet structure 7. Because of addition of the air "C" which has passed through the bypass passage 6, the air blown out from the air outlet structure 7 is somewhat cool as compared with the air blown out from the foot area air duct 11, which keeps the heads of the passengers cool and the feet warm. If the temperature difference between the upper and lower portions of the passenger compartment is small, the bypass door 10 is closed.

However, due to its inherent construction, the above-mentioned automotive air conditioning device has failed to give passengers satisfaction in the air conditioning. That is, since the bypass door 10 is constructed to take only the full-open and full-close positions and the control of the bypass door 10 is made by only the temperature difference and the quantity of solar radiation, the temperature control of the air blown into the passenger compartment through the air outlet structure 7 is not finely made in such a manner as to satisfy the passengers.

As is illustrated by a broken line in FIG. 16, the air outlet structure 7 is further provided with defrosting ducts 20 each having openings 22 exposed to the inner surface of a windshield of the vehicle. That is, when the air conditioning device takes a Def/Foot mode, the mixed air "A" and "B" and the air "C" are blown against the inner surface of the windshield through the defrosting duct 20 to defrost the windshield. In order to increase the defrosting ability of the air in the defrosting duct 20, it is desirable to increase the temperature of the air. However, too much warming of the air tends to bring about the undesired head-warm feeling to the passengers. Various tests and examinations have revealed that for obtaining satisfaction in both comfortable air conditioning and effective defrosting, it is preferable to control the temperature of the defrosting air (viz., the air which is led to the defrosting ducts) in such a manner as is depicted by the graphs of FIGS. 17 (a) and 17 (b). However, hitherto, it has been very difficult to control the temperature of the defrosting air in such manner.

SUMMARY OF THE INVENTION

It is therefore an object of the present invention to provide a control system of an automotive air conditioning device, which can finely control the temperature of air which is drawn out to the passenger compartment through the air outlet structure.

It is another object of the present invention to provide a control system for an automotive air conditioning device, which can finely control the temperature of air which-is blown against the inner surface of a windshield of the vehicle through the defrosting duct.

According to the present invention, there is provided a control system of an automotive air conditioning device. The air conditioning device includes a major duct structure having upstream, middle and downstream portions; an electric blower fan installed in the upstream portion to generate, upon energization, air flow from the upstream portion toward the downstream portion; an air outlet structure connected to the downstream portion, the outlet structure having openings exposed to a vertically middle part of the passenger compartment; a defrosting duct extending from the downstream portion, the defrosting duct having openings directed to the inner surface of a windshield of the vehicle; a foot area air duct extending from the downstream portion to a lower part of the passenger compartment; a cooling unit installed in the middle portion of the major duct structure; a heating unit installed in the downstream portion of the major duct structure; an air mix door which pivots to control the amount of air directed toward the heating unit; a bypass passage extending from the middle portion just downstream of the cooling unit to an upstream portion of the air outlet structure; and a bypass door pivotally installed in the bypass passage to control the amount of air flowing in the bypass passage. The control system comprises a first sensor for issuing a signal representing the ambient temperature; a second sensor for issuing a signal representing the solar radiation quantity; a third sensor for issuing a signal representing the temperature of the passenger compartment; a fourth sensor for issuing a signal representing the temperature of the portion just downstream of the cooling unit; a fifth sensor for issuing a signal representing the open degree of the air mix door; a sixth sensor for issuing a signal representing the open degree of the bypass door; first means for, based on the signals from the first and second sensors, deriving a first temperature of the air drawn out from either one of the air outlet structure and the defrosting duct; second means for based on the signals from the fourth and fifth sensors, deriving a second temperature of the air drawn out from the foot area air duct; third means for, based on the signal from the fourth sensor, the first temperature and the second temperature, deriving a ratio between the amount of air flowing in the bypass passage and that of the air blown out from the selected one of the air outlet structure and the defrosting duct; and fourth means for controlling the open degree of the bypass door in accordance with the derived ratio.

BRIEF DESCRIPTION OF THE DRAWINGS

FIGS. 1 to 9 are drawings showing a first embodiment of the present invention, in which:

FIG. 1 is a block diagram showing a control system employed in an automotive air conditioning device of the first embodiment;

FIG. 2 is a flowchart showing major operation steps executed in the control system;

FIG. 3 is a flowchart showing operation steps executed for controlling an air-mix door;

FIG. 4 is a flowchart showing operation steps executed for controlling a fresh-air vent door;

FIG. 5 is a graph showing the relationship between the ambient temperature, the solar radiation quantity and a target temperature of the air blown into the passenger compartment;

FIG. 6 is a graph for determining the parameter of the solar radiation quantity;

FIG. 7 is a graph showing the relationship between the open degree of the air-mix door, the temperature of the air positioned just downstream of an evaporator installed in a duct structure, and the temperature of the air blown to the foot area of the passenger compartment;

FIG. 8 is a graph showing the relationship between the open degree of the air-mix door and the ratio between the amount of air flowing in a fresh-air vent passage and that of air flowing in an air outlet structure; and FIG. 9 is a schematic view of an air duct structure, showing the manner in which air in the structure flows;

FIGS. 10 to 15 are drawings showing a second embodiment of the present invention, in which:

FIG. 10 is a flowchart showing a major part of operation steps executed in a control system for controlling a fresh-air vent door;

FIG. 11 is a flowchart showing a remaining part of the operation steps of FIG. 10;

FIG. 12 is a graph showing the relationship between the ambient temperature, the solar radiation quantity and a target temperature of the air blown against the windshield;

FIG. 13 is a graph for determining the parameter of the solar radiation quantity;

FIG. 14 is graph showing the relationship between the open degree of the air-mix door, the temperature of the air positioned just donwstream of an evaporator installed in a duct structure, and the temperature of the air blown to the foot area of the passenger compartment; and FIG. 15 is a graph showing the relationship between the open degree of the fresh-air vent door and the ratio between the amount of air flowing in a fresh-air vent passage (or bypass passage) and the amount of air flowing in an air outlet structure;

FIG. 17 (b) is a graph depicting the undesired head-warming feeling with respect to the relationship between the ambient temperature, the solar radiation quantity and the temperature of air blown against the windshield.

DETAILED DESCRIPTION OF THE INVENTION

In the following, the present invention will be described in detail with reference to the drawings.

Figure 16:
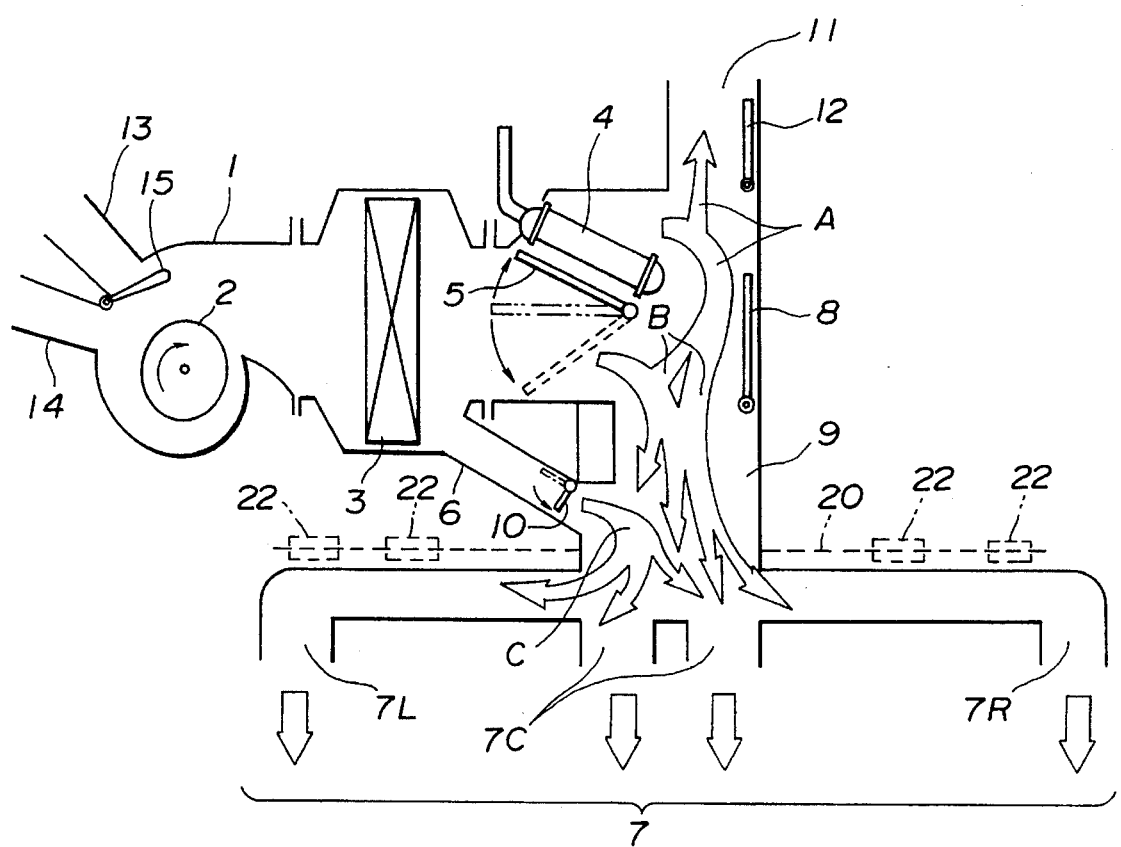
FIG. 16 is a schematic view of a conventional duct structure of an air conditioning device, showing the manner in which the air in the duct structure flows.
Figure 17A:
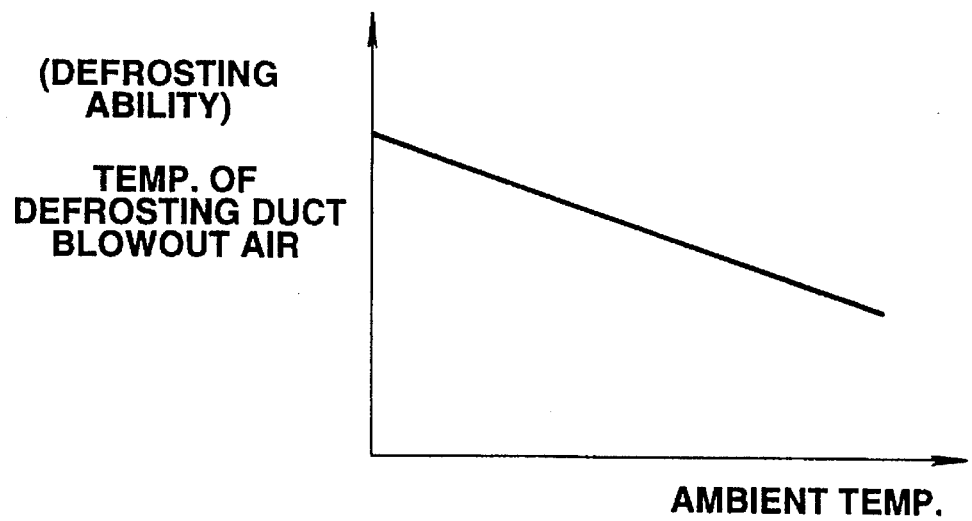
FIG. 17 (a) is a graph depicting the defrosting ability of air with respect to the relationship between the ambient temperature and the temperature of air blown against the windshield.
Figure 17B:
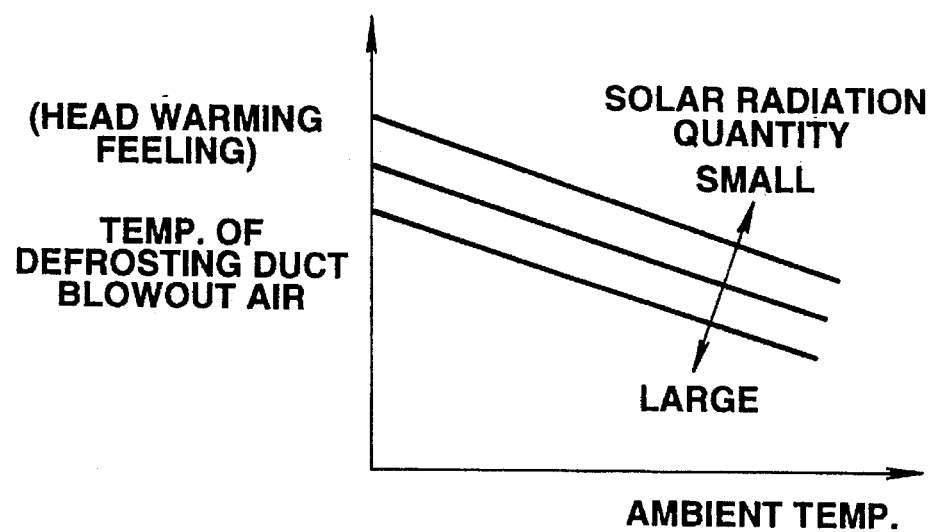

The present invention is incorporated with an air distribution mechanism which is substantially the same as that of the air conditioning device of FIG. 16. Thus, the following description on the present invention will be made with an aid of FIG. 16.

Referring to FIGS. 1 to 9 of the accompanying drawings, there is shown a first embodiment of the present invention.

Figure 1:
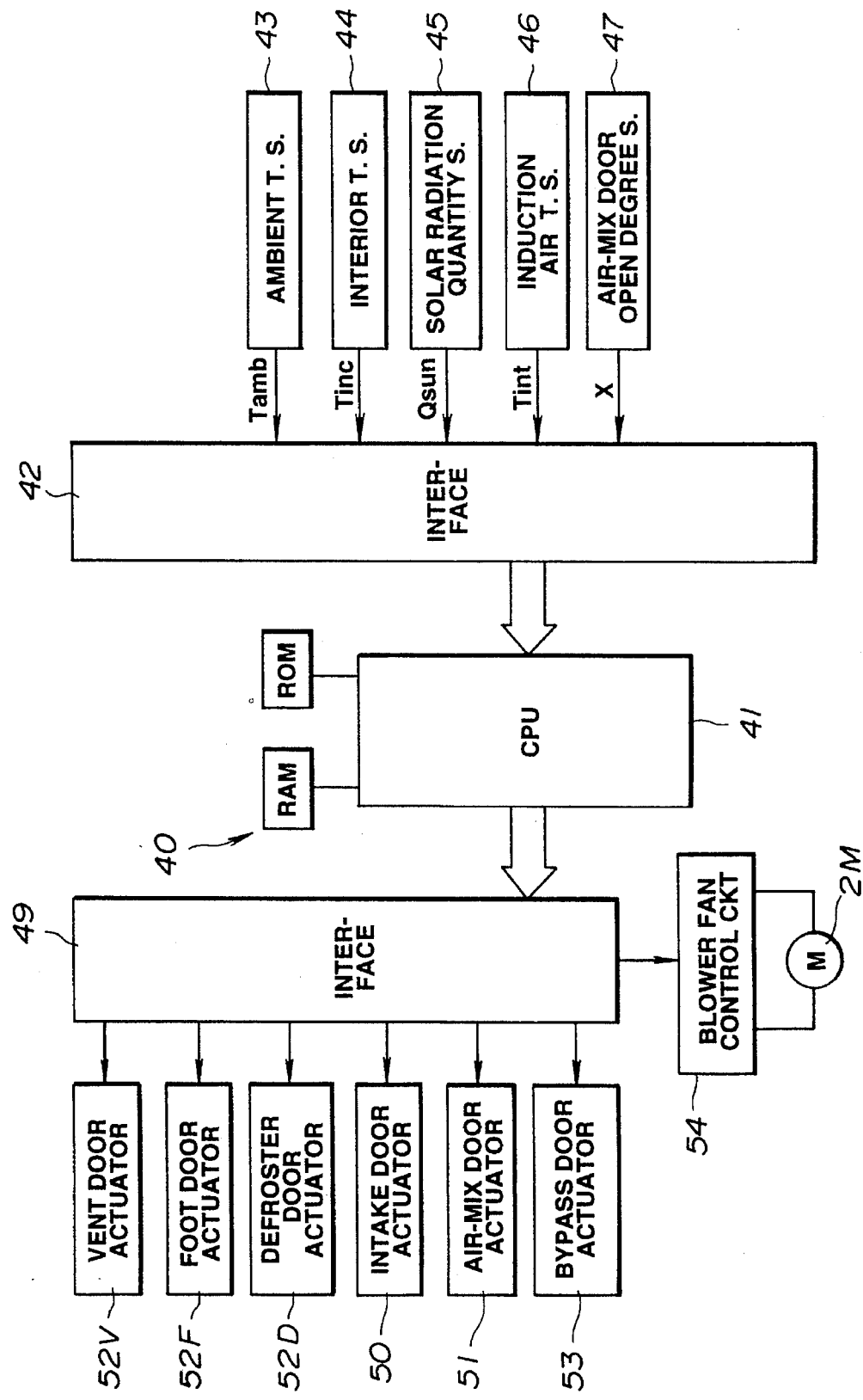

FIG. 1 shows a block diagram of a control system 40 which is employed in the first embodiment. The control system 40 comprises a CPU (central processing unit) 41, a ROM (read only memory) and a RAM (random access memory). The control system 40 has input and output interfaces 42 and 49 connected thereto. As shown, information signals "Tamb", "Tinc", "Qsun", "Tint" and "X" respectively issued from an ambient temperature sensor 43, an interior temperature sensor 44, a solar radiation quantity sensor 45, an induction air temperature sensor 46 and an air-mix door open degree sensor 47 are all fed to the input interface 42. The induction air temperature sensor 46 senses the temperature of air which is positioned just downstream of the evaporator 4 (see FIG. 16). The air-mix door open degree sensor 47 senses the open degree of the air-mix door 5 (see FIG. 16).

Instruction signals prepared by the control system 40 are applied through the output interface 49 to an actuator 50 of the intake door 15 (see FIG. 16, an actuator 51 of the air-mix door 5, an actuator 52V of the vent door 8, an actuator 52F of the foot door 12, a defroster door actuator 52D, an actuator 53 of the bypass door 10 and a control circuit 54 of the blower fan 2. The defroster door actuator 52D actuates a pivotal door (not shown) installed in each of the defrosting ducts 20 (see FIG. 16). A blower fan motor "2M" is connected to the control circuit 54.

In the present invention, in accordance with the various information signals issued from the sensors 43, 44, 45, 46 and 47, the control system 40 controls the various actuators 50, 51, 52D, 52F, 52V and 53 and the blower fan control circuit 54 in such a manner as will become apparent as the description proceeds.

Figure 2:
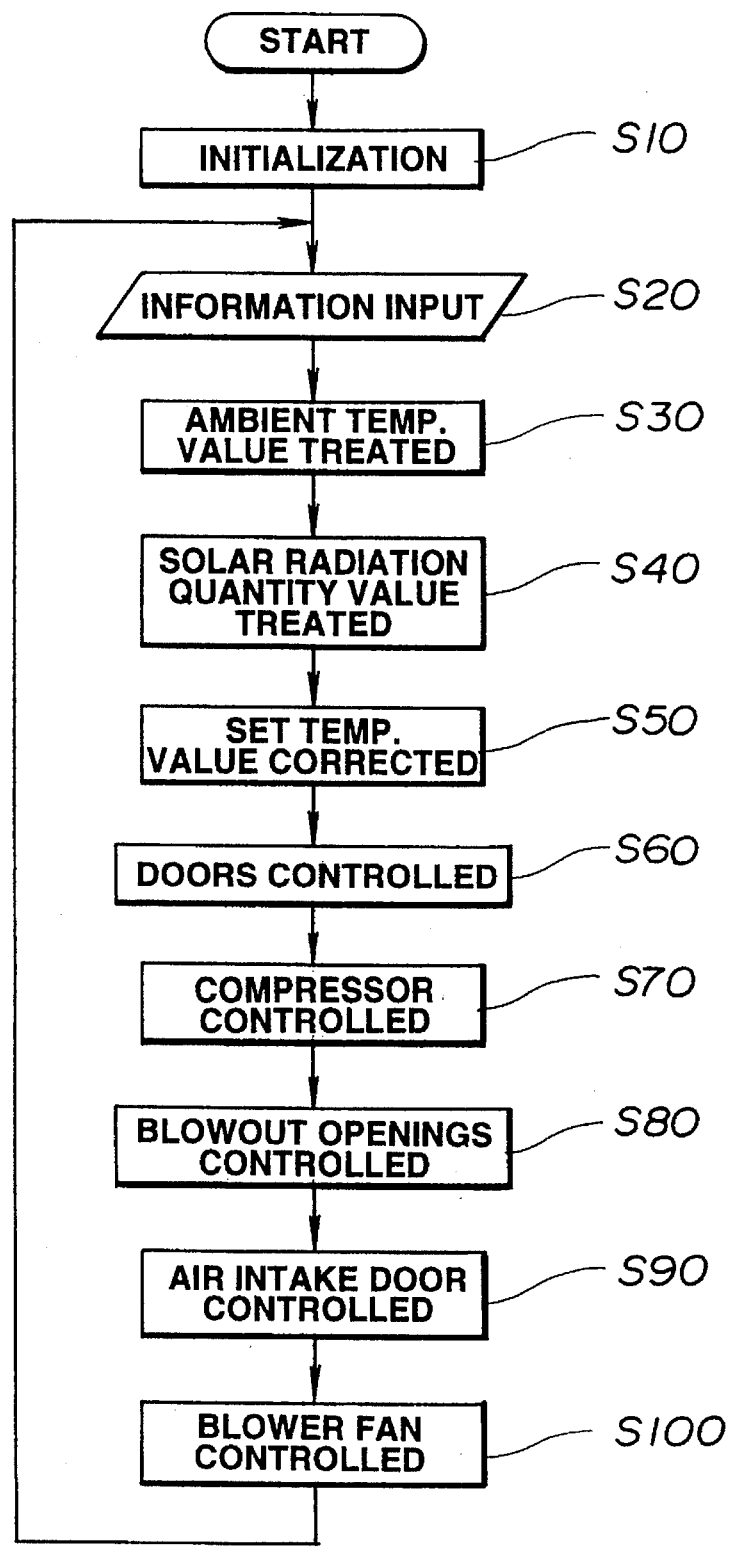

Referring to FIG. 2, there is shown a flowchart which depicts basic operation steps which are executed in the control system 40 for controlling the air conditioning device of the invention.

At step S10, initialization is carried out. That is, in a normal automatic air conditioning mode, the set temperature "Tptc" is determined to 25° C. At step S20, information provided by the various sensors is read. That is, the set temperature "Tptc" is inputted by manipulating a known temperature setter (not shown) arranged on an instrument panel of the vehicle. The information comprises the temperature "Tinc" of the passenger compartment sensed by the interior temperature sensor 44, the temperature "Tamb" of the ambient air sensed by the ambient temperature sensor 43, the temperature "Tint" of the induction air sensed by the induction air temperature sensor 46, the solar radiation quantity "Qsun" sensed by the solar radiation quantity sensor 46 and the open degree of the air-mix door 5 sensed by the air-mix door open degree sensor 47. Then, at step S30, the information signal "Tamb" from the ambient temperature sensor 43 is treated to remove therefrom a noise part caused by other heat sources. With this, a signal representing the real ambient temperature "Tam" is provided. Then, at step S40, the information signal "Qsun" from the solar radiation quantity sensor 46 is treated to provide a signal "Q'sun" which, for ease with which a subsequent processing is carried out, represents the quantity of heat. Then, at step S50, the set temperature "Tptc" which has been set by the temperature setter is corrected to "T'ptc" with reference to the ambient temperature. At step S60, as will be described in detail hereinafter, the open degree of the air-mix door 5 is controlled in accordance with the values "T'ptc", "Tinc", "Tam" and "Q'sun", and the open degree of the bypass door 10 is controlled in accordance with the values "Tint", "Tam" and Q"sun". At step S70, a compressor (not shown) for compressing a coolant fed to the evaporator 3 is controlled in ON/OFF manner. At Step S80, various blowout openings are controlled. That is, in the air conditioning device, there are provided various blowout modes, which are a Vent mode in which air is blown out from the air vents 7C, 7L and 7R of the air outlet structure 7 (see FIG. 16), a Foot mode in which air is blown out from the foot area air duct 11, a Defrosting mode in which air is blown out from the defrosting ducts, a Bi-Level mode in which air is blown out from the air vents 7C, 7L and 7R as well as from the foot area air duct 11, and a Def-Foot mode in which air is blown out from the defrosting ducts 20 as well as from the foot area air duct 11. These modes are provided by moving the vent door 8, the foot door 12 and the defroster doors with an aid of the actuators 52V, 52F and 52D. At step S90, control of an air induction is made. That is, the air intake door 15 is controlled to close the passage 13 or the passage 14. At step S100, the blower fan 2 is controlled to control the amount of air blown out from the various blowout openings. Thereafter, the operation returns to step S20.

Figure 3:
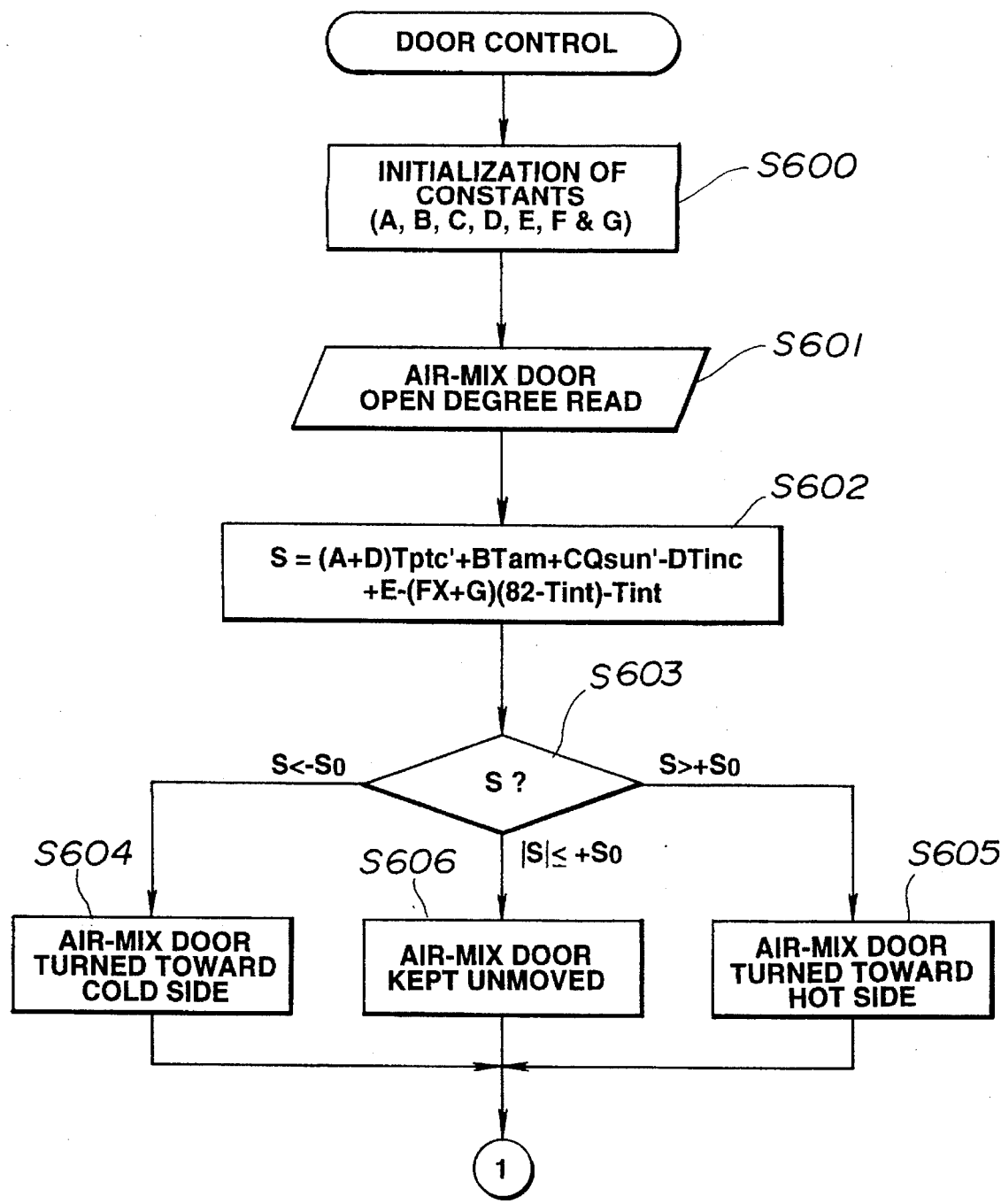
Figure 4:
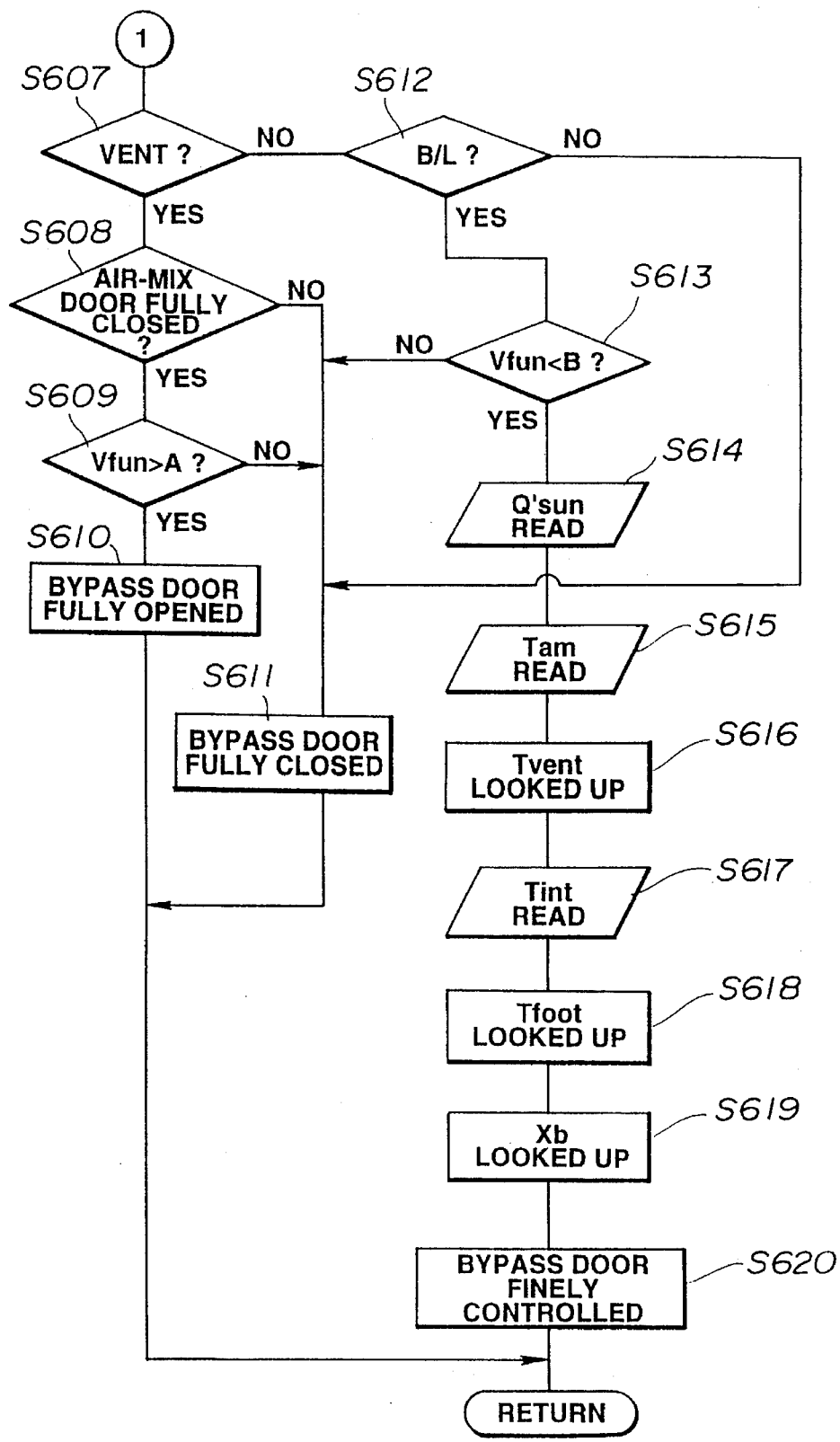
Figure 5:
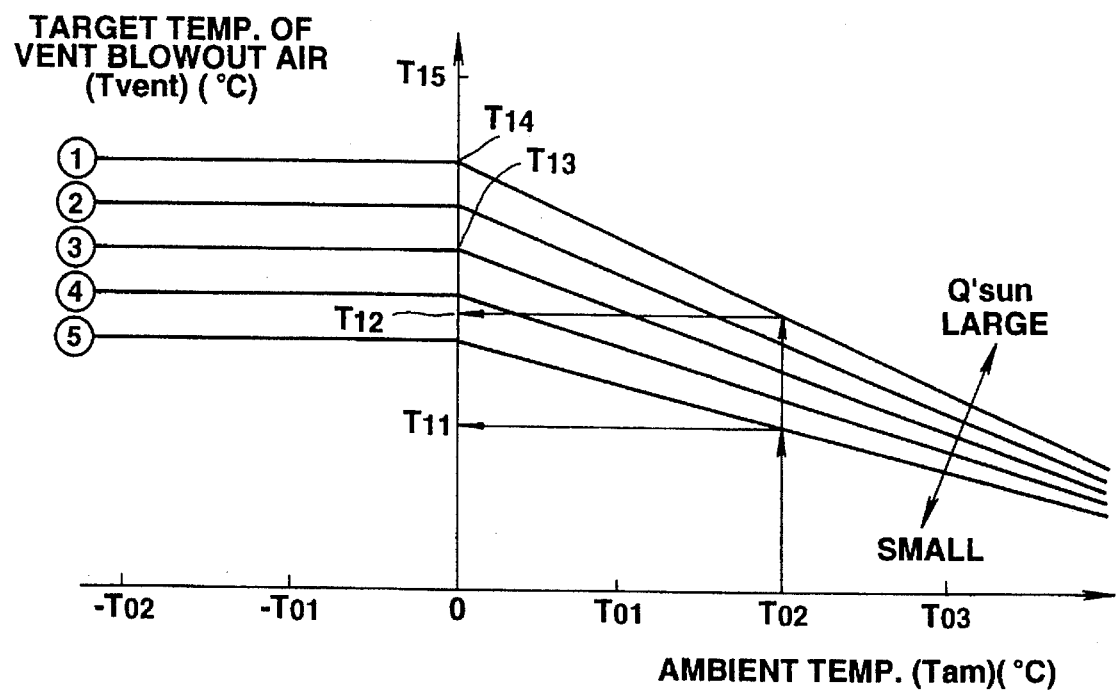
Figure 6:
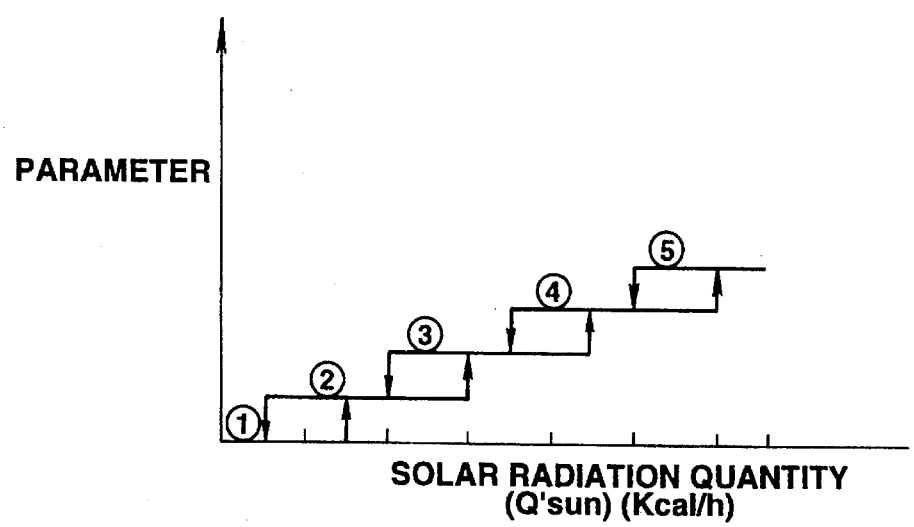
Figure 7:
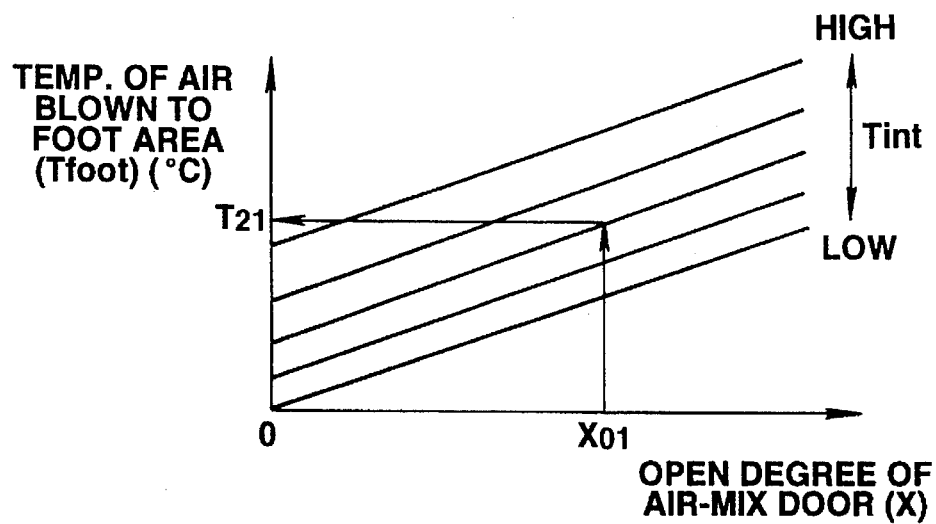
Figure 8:
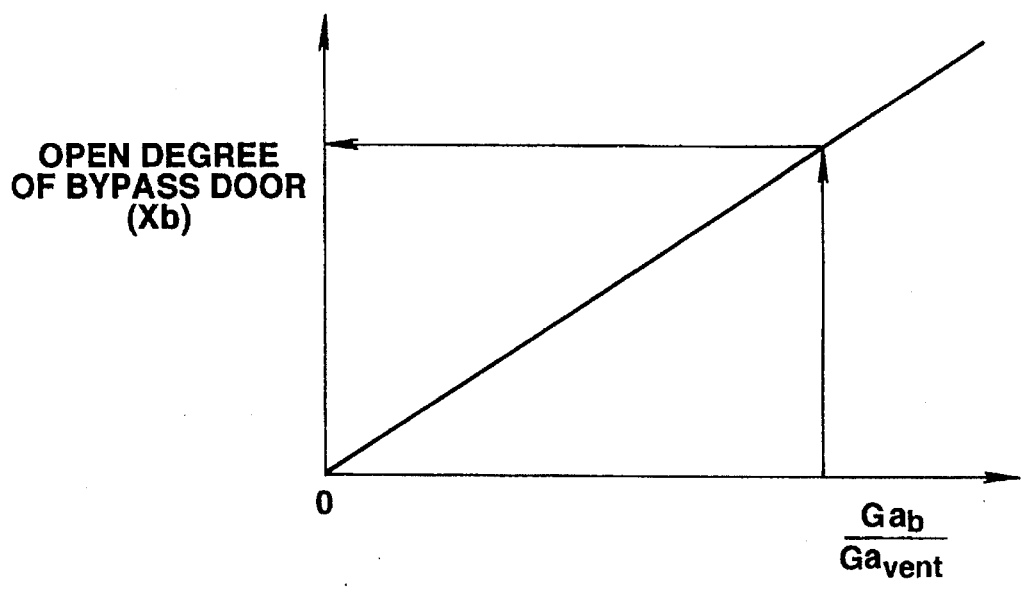

Referring to FIGS. 3 and 4, there are shown flowcharts which depict the detail of the step S60 of the flowchart of FIG. 2.

The flowchart of FIG. 3 shows the programmed operation steps which are executed for controlling the air-mix door 5.

That is, at step S600, constants "A" to "G" (which will be described hereinafter) are initialized, and at step S601, the existing open degree "X" of the air-mix door 5 is read from the information signal from the air-mix door open degree sensor 47. Then, at step S602, the following equation (1) is executed for obtaining the difference "S" between a target temperature "To" of the blowout air and the real temperature of the blowout air. It is to be noted that the blowout air is the air which is blown out from the air outlet structure 7 (see FIG. 16).

$$S=(A+D)Tptc'+BTam+CQsun'-DTinc+E-(FX+G)(82-Tint)-Tint \quad (1)$$

Then, at step S603, the derived difference "S" is compared with a predetermined value "So". If "S<-So" is established, the operation flow goes to step S604. At this step, the air-mix door 5 is pivoted toward a cold side, that is, in a direction to reduce the amount of air which passes through the heater core 4. If "S>+So" is established, the operation flow goes to step S605 to pivot the air-mix door 5 toward a hot side, that is, in a direction to increase the amount of the air which passes through the heater core 4. While, if "|S|≦+So" is established, the operation flow goes to step S606. At this step, the air-mix door 5 is kept unmoved.

The flowchart of FIG. 4 shows the programmed operation steps which are executed, after the above-mentioned control of the air-mix door 5, for controlling the bypass door 10.

That is, at step S607, a judgment is carried out as to whether the air conditioning device selects the Vent mode or not. If yes, the operation mode goes to step S608. At this step, a judgment is carried out as to whether the open degree "X" of the air-mix door 5 is zero or not, that is, whether or not the air-mix door 5 fully closes the passage led to the heater core 4. If Yes, the operation flow goes to step S609 to judge whether a fan voltage "Vfan" derived at the step S100 of the flowchart of FIG. 2 is higher than a predetermined value "A" or not. If Yes, the operation flow goes to step S610 and the bypass door 10 is fully opened. If, at step S608, judgment is made No, that is, when the air-mix door 5 does not fully close the passage led to the heater core 4, and if, at step S609, judgment is made No, that is, when the fan voltage "Vfan" is lower than the predetermined value "A", the operation flow goes to step S611 and the bypass door 10 is fully closed.

If, at step S607, judgment is made No, that is, when the air conditioning device does not select the Vent mode, the operation flow goes to step S612 to judge whether the air conditioning device selects a Bi-Level mode or not. If Yes, the operation flow goes to step S613 and a judgment is carried out as to whether the fan voltage "Vfan" is lower than a predetermined value "B" (≠A) or No. If Yes, the operation flow goes to step S614 and the solar radiation quantity "Q'sun" is read. Then, at step S615, the ambient temperature "Tam" is read. Thereafter, the operation flow goes to step S616. At this step, a target temperature "Tvent" of the vent blowout air is looked up from a map shown in FIG. 5. In the map, the ambient temperature "Tam" and the target temperature "Tvent" of the vent blowout air are plotted on the axes of abscissas and ordinates respectively, and the target temperature "Tvent" is determined using the solar radiation quantity "Q'sun" as a parameter. That is, the target temperature "Tvent" of the vent blowout air is derived from a combination of the ambient temperature "Tam" and the solar radiation quantity "Q'sun". The parameter of the solar radiation quantity "Q'sun" is looked up from a map of FIG. 6. In this map, the solar radiation quantity "Q'sun" is plotted on the axis of abscissas, and the parameter 1, 2, 3, 4 or 5 is plotted on the axis of ordinates.

After looking up the target temperature "Trent" of the vent blowout air at step 8616, the operation flow goes to step S617 to read the induction air temperature "Tint" (viz., the temperature of the air positioned just downstream of the evaporator 4). Then, at step S618, the temperature "Tfoot" of the air blown to the foot area through the foot area air duct 11 is looked up from a map shown in FIG. 7. In the map, the open degree "X" of the air-mix door 5 and the foot area air temperature "Tfoot" are plotted on the axes of the abscissas and ordinates respectively, and the foot area air temperature "Tfoot" is determined using the induction air temperature "Tint" as a parameter. Thus, the foot area air temperature "Tfoot" is estimated from a combination of the air-mix door open degree "X" and the induction air temperature "Tint".

After the step S618, the operation flow goes to step S619. At this step, the open degree "Xb" of the bypass door 10 is looked up from a map shown in FIG. 8. In this map, the ratio "$Ga_b/Ga_{vent}$" between the air amount "$Ga_b$" flowing in the bypass passage 6 and the air amount "$Ga_{vent}$" blown out from the air outlet structure 7 is plotted on the axis of the abscissas and the open degree "Xb" of the bypass door 10 is plotted on the axis of ordinates.

Then, at step S620, the bypass door 10 is actually and finely controlled to take the open degree "Xb" which has been looked up at step S619.

In the following, the reason why the ratio "$Ga_b/Ga_{vent}$" can be used for determining the open degree "Xb" of the bypass door 10 will be described with reference to FIGS. 9 and 16.

Figure 9:
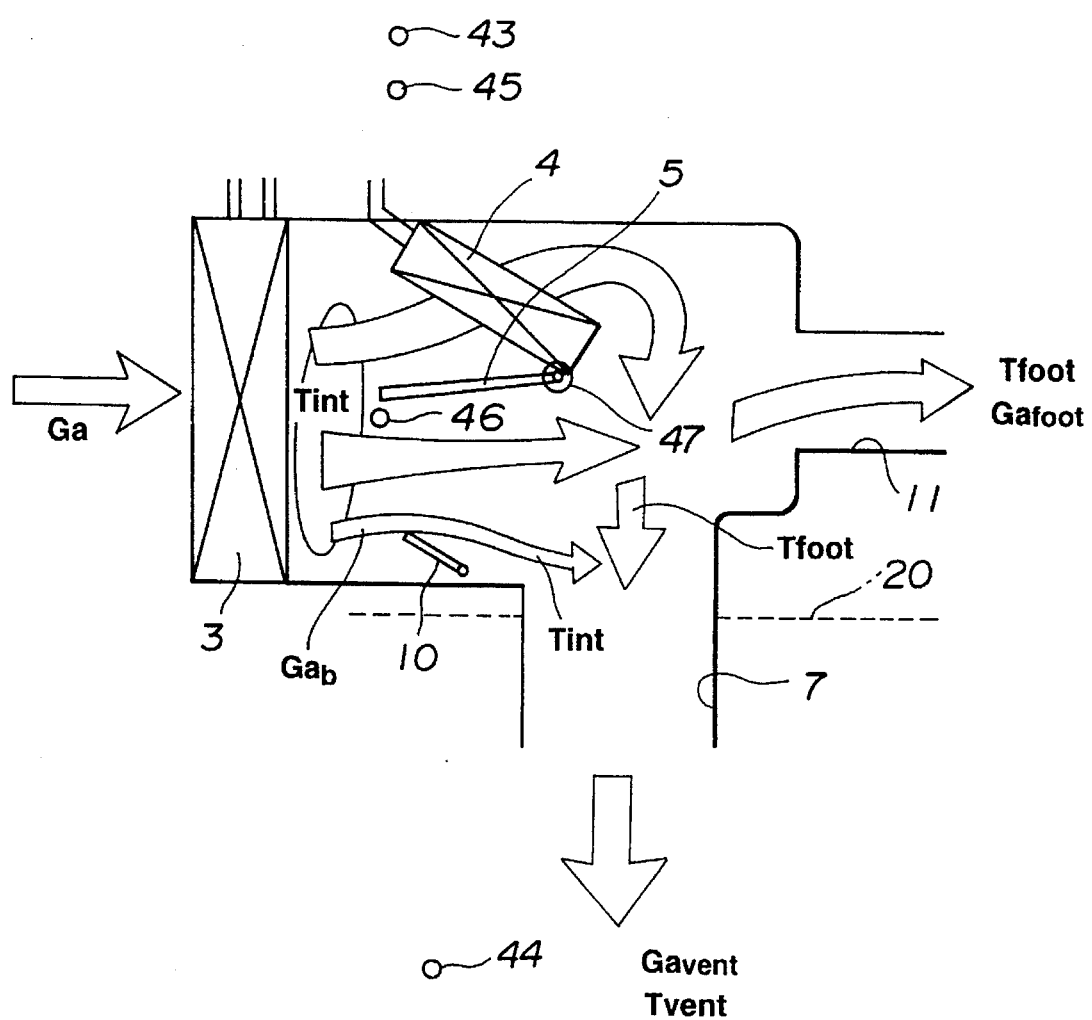

In FIG. 9, the temperature (viz., the induction air temperature) of air positioned just downstream of the evaporator 3 is denoted by "Tint", the temperature (viz., vent blowout air temperature) of air blown out from the air outlet structure 7 is denoted by "Tvent", the temperature (viz., the foot area air temperature) of air blown out from the foot area air duct 11 is denoted by "Tfoot", the amount of air which passes through the bypass passage 6 is denoted by "Gab" and the amount of air blown out from the air outlet structure 7 is denoted by "$Ga_{vent}$".

As is seen from the drawing of FIG. 9, the quantity of heat of the air blown out from the air outlet structure 7 is the sum of the quantity of heat of the air which flows from the bypass passage 6 into the air outlet structure 7 and that of the air which flows from the position downstream of the heater core 4 into the air outlet structure 7. Thus, the quantity (viz., $Ga_{vent} \times Tvent$) of heat of the air blown out from the air outlet structure 7 is represented by the following equation (2):

$$Ga_{vent} \times Tvent = Ga_b \times Tint + (Ga_{vent} - Ga_b) \times Tfoot \qquad (2)$$

The equation (2) can be transformed to the following equation (3):

$$Ga_b/Ga_{vent} = (Tvent - Tfoot) / (Tint - Tfoot) \qquad (3)$$

It is to be noted that the right side of the equation (3) is composed of elements which have been derived or actually sensed. That is, "Tvent" has been derived at step S616, "Tfoot" has been derived at step S618 and "Tint" has been read at step S617.

That is, by calculating the right side of the equation (3), the ratio "$Ga_b/Ga_{vent}$" from which the open degree "Xb" of the bypass door 10 can be determined is obtained.

As will be understood from the above, the air-mix door 5 and the bypass door 10 are controlled in accordance with the information signals from the ambient temperature sensor 43, the interior temperature sensor 44, the solar radiation quantity sensor 45, the induction air temperature sensor 46, the air-mix door open degree sensor 47 and the temperature setter arranged on an instrument panel.

In the above-described first embodiment, only one passenger compartment temperature sensor 44 is employed, unlike the case of the aforementioned prior art air conditioning device which uses two passenger compartment temperature sensors. Furthermore, in the first embodiment, the bypass door 10 is controlled to continuously pivot to take any angular position for controlling the temperature of the blowout air from the air outlet structure 7, which is different from the case of the prior art device. That is, in this first embodiment, the target temperature of the air blown out from the air outlet structure 7 is derived from the combination of the ambient temperature and the solar radiation quantity, and in order to allow the air from the air outlet structure 7 to have the target temperature, the open degree of the bypass door 10 is finely controlled based on the calculated value of the equation (3). Thus, the temperature of the blowout air from the air outlet structure 7 can be finely controlled in accordance with the ambient temperature and the solar radiation quantity.

Referring to FIGS. 10 to 15, there is shown a second embodiment of the present invention.

In this second embodiment, there is provided a Def-Foot mode in which temperature controlled air is blown out from the defrosting ducts 20 as well as the foot area air duct 11. That is, in the Def-Foot mode, cooled air passing through the bypass passage 6 can be blown out from the openings of the defrosting ducts 20. Also, in this mode, the open degree of the bypass door 10 is controlled based on the ratio established between the air amount flowing in the bypass passage 6 and the air amount blown out from the air outlet structure 7.

Figure 10:
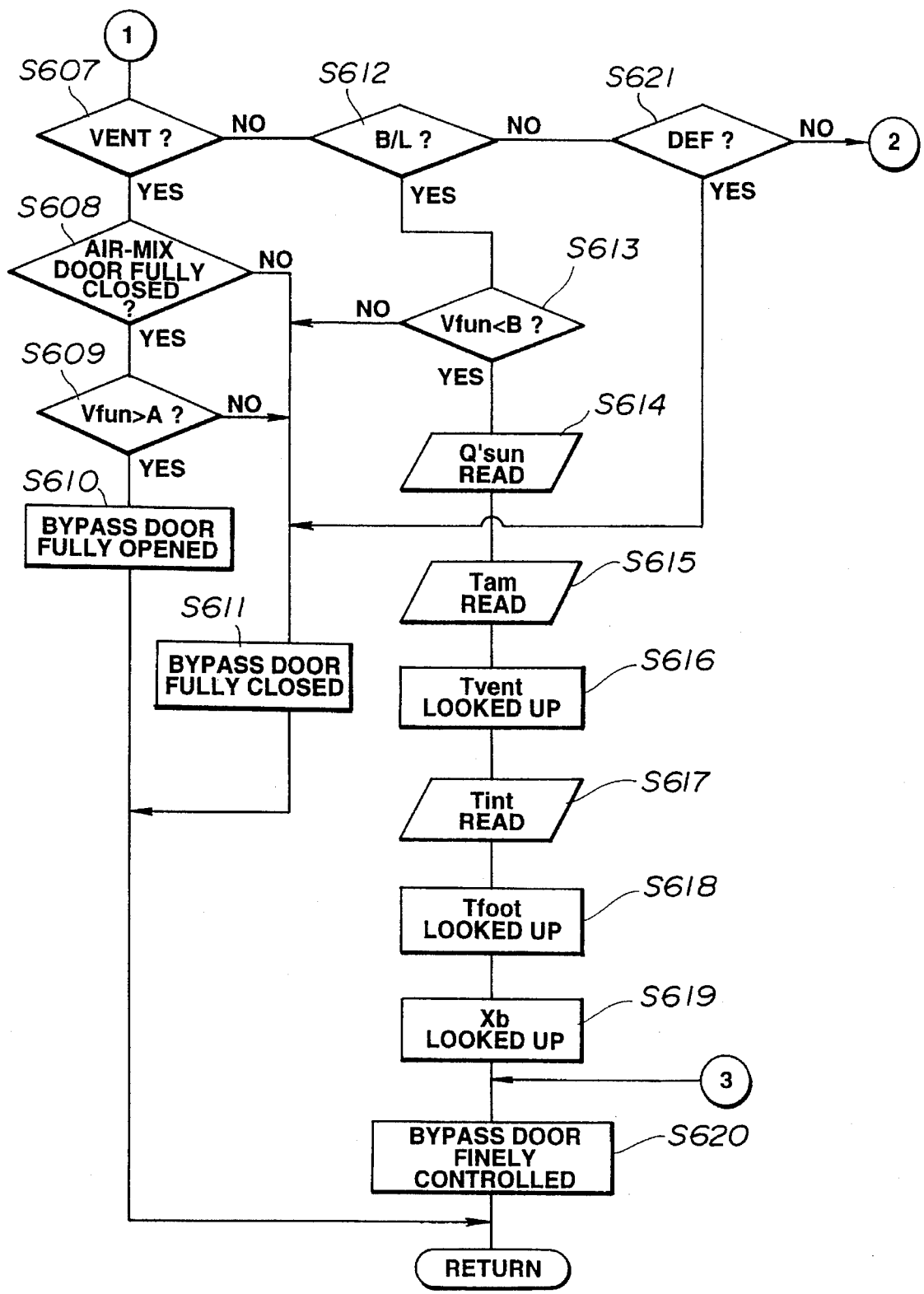
Figure 11:
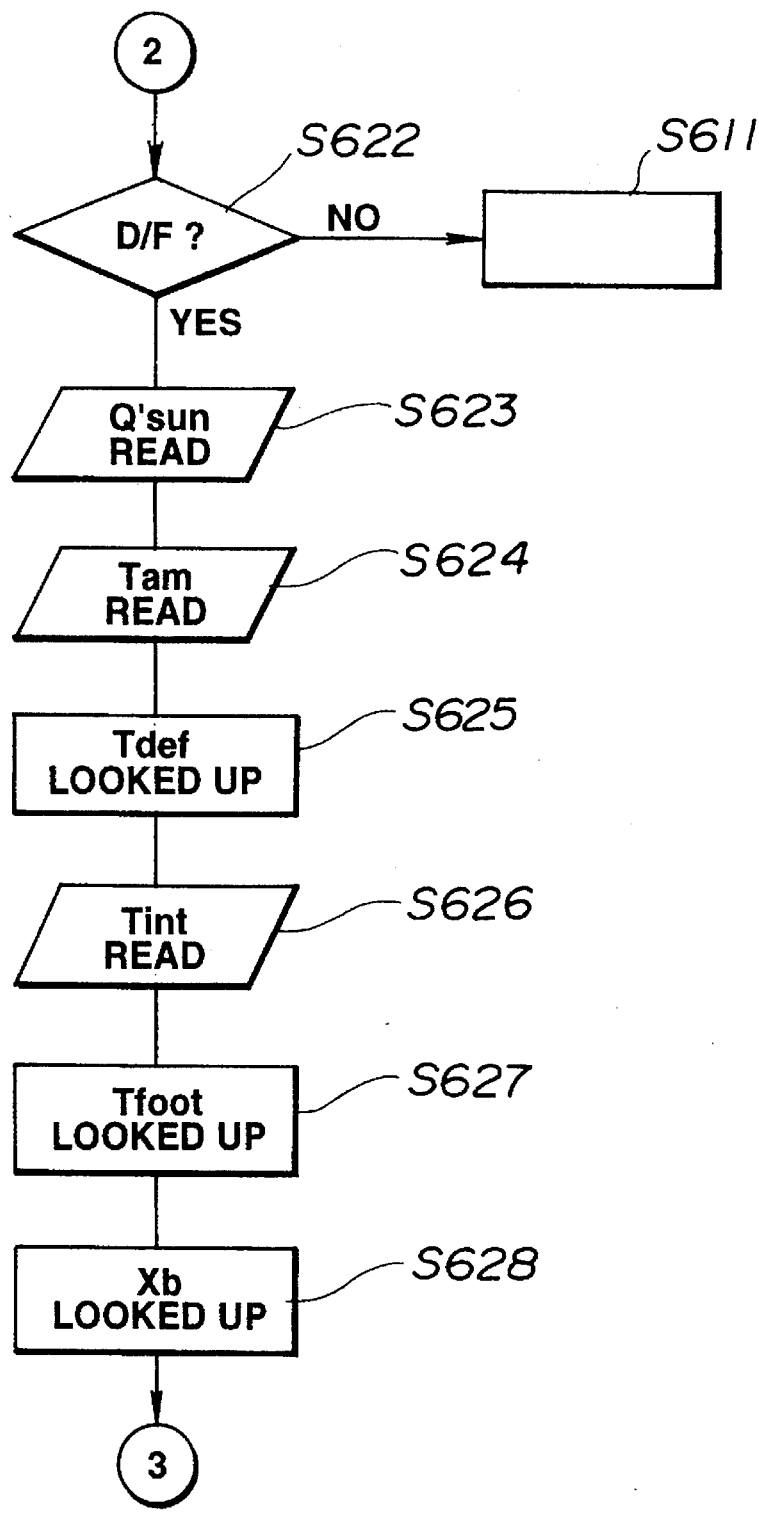
Figure 12:
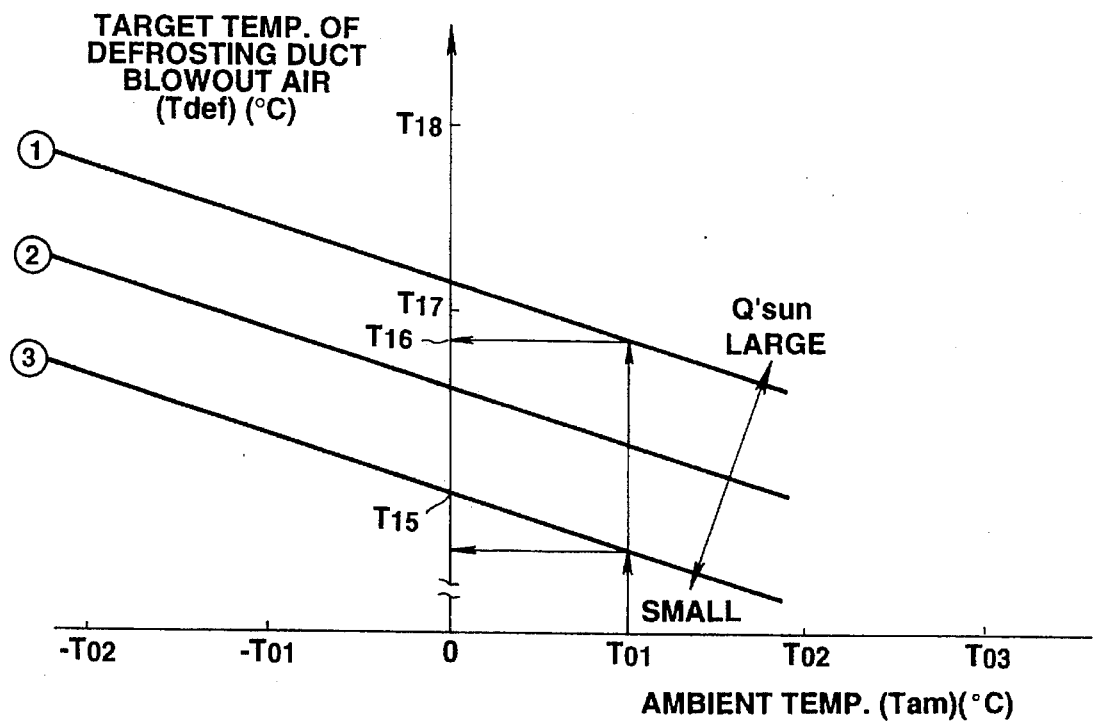
Figure 13:
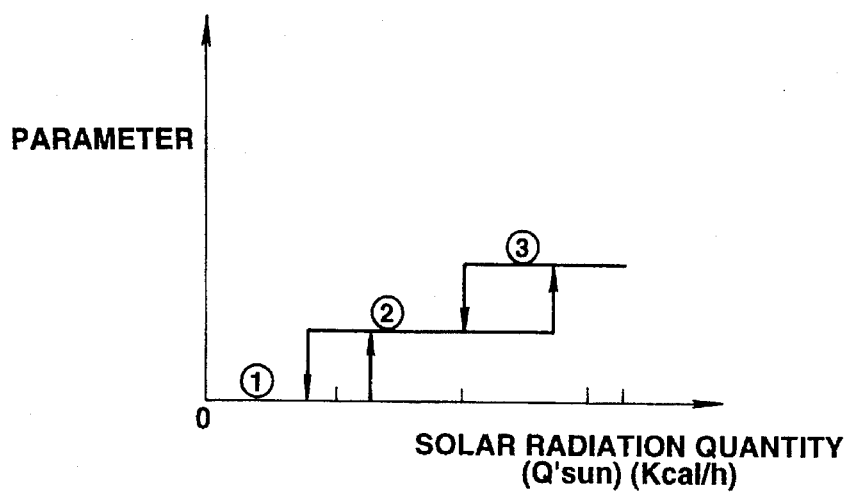
Figure 14:
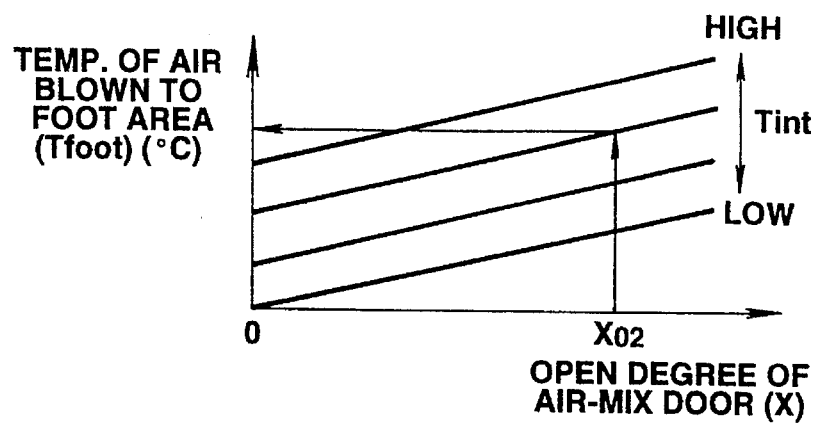
Figure 15:
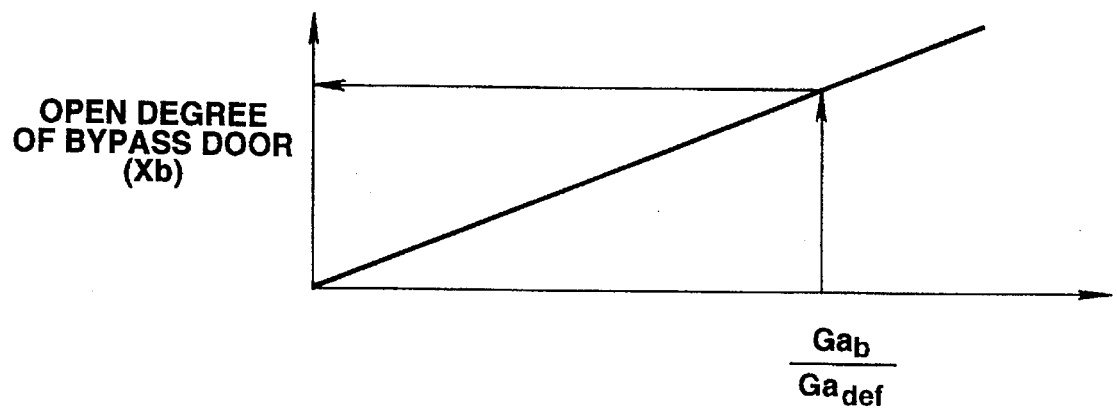

Referring to FIGS. 10 and 11, there is shown a flowchart which depicts the operation steps which are executed after the control of the air-mix door 5, that is, after completion of the programmed operation steps shown in FIG. 3.

As will be understood from FIG. 10, in the second embodiment, the operation steps denoted by S607 to S620 are the same as those of the above-mentioned first embodiment of FIG. 4. Thus, in the following, only the operation steps different from those of the first embodiment will be described.

If, at step S612, it is judged that the air conditioning device does not select the Bi-Level mode. The operation flow goes to step S621. At this step, a judgment is carried out as to whether the Defrosting mode is selected or not. If Yes, the operation flow goes to step S611 and thus the bypass door 10 is fully closed. If No at step 621, that is, when the air conditioning device does not select the Defrosting mode, the operation flow goes to step S622 (see FIG. 11). At this step, a judgment is carried out as to whether the Def Foot mode is selected or not. If No, the operation flow goes to step S611 to close the bypass door 10. While, if Yes, the operation step goes to step S623 and the solar radiation quantity "Q'sun" is read. Then, at step S624, the ambient temperature "Tam" is read. Thereafter, the operation flow goes to step S625. At this step, a target temperature "Tdef" of the air which would be blown out from the defrosting ducts 20 is looked up from a map shown in FIG. 12. In the map, the ambient temperature "Tam" sensed by the ambient temperature sensor 43 and the temperature "Tdef" of the air blown out from the defrosting ducts 20 are respectively plotted on the axes of abscissas and ordinates. The target temperature "Tdef" is determined using the solar radiation quantity "Q'sun" as a parameter. That is, the target temperature "Tdef" of the air in the defrosting ducts 20 is derived from the combination of the ambient temperature "Tam" and the solar radiation quantity "Q'sun". The parameter of the solar radiation quantity "Q'sun" is looked up from a map of FIG. 13. In this map, the solar radiation quantity "Q'sun" is plotted on the axis of abscissas, and the parameter 1, 2 or 3 is plotted on the axis of ordinates.

After looking up, at step S625, the target temperature "Tdef" of the air which would be blown out from the defrosting ducts 20, the operation flow goes to step S626 to read the induction air temperature "Tint" (viz., the temperature of air positioned just downstream of the evaporator 4). Then, at step S627, the temperature "Tfoot" of the air blown to the foot area through the foot area air duct 11 is looked up from a map of FIG. 14. In the map, the open degree "X" of the air-mix door 5 and the foot area air temperature "Tfoot" are respectively plotted on the axes of the abscissas and ordinates, and the foot area air temperature "Tfoot" is determined using the induction air temperature "Tint" as a parameter. Thus, the foot area air temperature "Tfoot" is estimated from the combination of the air-mix door open degree "X" and the induction air temperature "Tint".

After the step S627, the operation flow goes to step S628. At this step, the open degree "Xb" of the bypass door 10 is looked up from a map of FIG. 15. In this map, the ratio "$Ga_b/Ga_{def}$" between the amount "$Ga_b$" of the air flowing in the bypass passage 6 and the amount "$Ga_{def}$" of the air blown out from the defrosting ducts 20 is plotted on the axis of the abscissas and the open degree "Xb" of the bypass door 10 is plotted on the axis of ordinates.

Then, the operation flow goes to step S620 of FIG. 10 to actually control the bypass door 10 in accordance with the open degree "Xb" looked up.

In the following, the reason why the ratio "$Ga_b/Ga_{def}$" can be used for determining the open degree "Xb" of the bypass door 10 will be described with reference to FIGS. 9 and 16.

The quantity of heat of the air blown out from the defroster nozzle is the sum of the quantity of heat of the air which flows from the bypass passage 6 into the foot area air duct 11 and that of the air which flows from the position downstream of the heater core 4 into the foot area air duct 11. Thus, the quantity (viz., $Ga_{def} \times Tdef$) of heat of the air blown out from the defrosting ducts 20 is represented by the following equation (4):

$$Ga_{def} \times Tdef = Ga_b \times Tint + (Ga_{def} - Ga_b) \times Tfoot \quad (4)$$

The equation (4) can be transformed to the following equation (5):

$$Ga_b/Ga_{def} = (Tdef - Tfoot) / (Tint - Tfoot) \quad (5)$$

It is to be noted that the right side of the equation (5) is composed of elements which have been derived or actually sensed. That is, "Tdef" has been derived at step S625, "Tfoot" has been derived at step S627 and "Tint" has been read at step S626.

That is, by calculating the right side of the equation (5) from which the open degree "Xb" of the bypass door 10 can be determined is obtained.

In the above-described second embodiment, only one passenger compartment temperature sensor 44 is employed, unlike the case of the aforementioned prior art air conditioning device which uses two passenger compartment temperature sensors. Furthermore, in the second embodiment, the bypass door 10 is controlled to continuously and finely pivot to take any angular position for controlling the temperature of the defrosting air, which is different from the prior art device. That is, in the second embodiment, the target temperature of the defrosting air (viz., the air flowing in the defrosting ducts 20) is derived from the combination of the ambient temperature and the solar radiation quantity, and in order to allow the defrosting air to have the target temperature, the open degree of the bypass door 10 is finely controlled based on the calculated value of the equation (5). Thus, the temperature of the defrosting air can be finely controlled in accordance with the ambient temperature and the solar radiation quantity.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. In an air conditioning device for use in a vehicle having a passenger compartment, said air conditioning device including a major duct structure having upstream, middle and downstream portions; an electric blower fan installed in said upstream portion to generate, upon energization, air flow from said upstream portion toward said downstream portion; an air outlet structure connected to said downstream portion, said outlet structure having openings exposed to a vertically middle part of said passenger compartment; a defrosting duct extending from said downstream portion, said defrosting duct having openings directed to the inner surface of a windshield of the vehicle; a foot area air duct extending from said downstream portion to a lower part of said passenger compartment; a cooling unit installed in said middle portion of said major duct structure; a heating unit installed in said downstream portion of said major duct structure; an air mix door which pivots to control the amount of air directed toward said heating unit; a bypass passage extending from said middle portion just downstream of said cooling unit to an upstream portion of said air outlet structure; and a bypass door pivotally installed in said bypass passage to control the amount of air flowing in said bypass passage, a control system for controlling said air conditioning device, comprising:

a first sensor for issuing a signal representing an ambient temperature;

a second sensor for issuing a signal representing a solar radiation quantity;

a third sensor for issuing a signal representing a temperature of said passenger compartment;

a fourth sensor for issuing a signal representing a temperature of said middle portion of said major duct structure just downstream of said cooling unit;

a fifth sensor for issuing a signal representing an open degree of said air mix door;

a sixth sensor for issuing a signal representing an open degree of said bypass door;

first means for, based on the signals from said first and second sensors, deriving a first temperature of the air drawn out from either one of said air outlet structure and said defrosting duct;

second means for, based on the signals from said fourth and fifth sensors, deriving a second temperature of the air drawn out from said foot area air duct;

third means for, based on the signal from said fourth sensor, the first temperature and the second temperature, deriving a ratio between the amount of air flowing in said bypass passage and that of the air blown out from the selected one of said air outlet structure and said defrosting duct; and fourth means for controlling the open degree of said bypass door in accordance with the derived ratio.

2. A control system as claimed in claim 1, in which said third means derives said ratio (R) by executing the following equation:

$$R=(Tvent/def-Tfoot)/(Tint-Tfoot)$$

wherein:

Tvent/def: derived first temperature

Tfoot: derived second temperature

Tint: temperature sensed by the fourth sensor.

3. A control system as claimed in claim 2, in which said first, second, and third means are installed in a computer.

4. A control system as claimed in claim 3, in which said fourth means is an electric actuator which actuates said bypass door in accordance with an instruction signal issued by said computer.

5. In an air conditioning device for use in a vehicle having a passenger compartment, said air conditioning device including a major duct structure having upstream, middle and downstream portions; an electric blower fan installed in said upstream portion to generate, upon energization, air flow from said upstream portion toward said downstream portion; an air outlet structure connected to said downstream portion, said outlet structure having openings exposed to a vertically middle part of said passenger compartment; a defrosting duct extending from said downstream portion, said defrosting duct having openings directed to the inner surface of a windshield of the vehicle; a foot area air duct extending from said downstream portion to a lower part of said passenger compartment; a cooling unit installed in said middle portion of said major duct structure; a heating unit installed in said downstream portion of said major duct structure; an air mix door which pivots to control the amount of air directed toward said heating unit; a bypass passage extending from said middle portion just downstream of said cooling unit to an upstream portion of said air outlet structure; and a bypass door pivotally installed in said bypass passage to control the amount of air flowing in said bypass passage, a control system for controlling said air conditioning device, comprising:

a first sensor for issuing a signal representing an ambient temperature;

a second sensor for issuing a signal representing a solar radiation quantity;

a third sensor for issuing a signal representing a temperature of said passenger compartment;

a fourth sensor for issuing a signal representing a temperature of the portion just downstream of said cooling unit;

a fifth sensor for issuing a signal representing an open degree of said air mix door;

a sixth sensor for issuing a signal representing an open degree of said bypass door;

first means for, based on the signals from said first and second sensors, deriving a first temperature of the air drawn out from said air outlet structure;

second means for, based on the signals from said fourth and fifth sensors, deriving a second temperature of the air drawn out from said foot area air duct;

third means for, based on the signal from said fourth sensor, the first temperature and the second temperature, deriving a ratio between the amount of air flowing in said bypass passage and that of the air blown out from said air outlet structure; and fourth means for controlling the open degree of said bypass door in accordance with the derived ratio.

6. A control system as claimed in claim 5, in which said third means derives said ratio (R) by executing the following equation:

$$R=(Tvent/def-Tfoot)/(Tint-Tfoot)$$

wherein:

Tvent/def: derived first temperature

Tfoot: derived second temperature

Tint: temperature sensed by the fourth sensor.

7. In an air conditioning device for use in a vehicle having a passenger compartment, said air conditioning device including a major duct structure having upstream, middle and downstream portions; an electric blower fan installed in said upstream portion to generate, upon energization, air flow from said upstream portion toward said downstream portion; an air outlet structure connected to said downstream portion, said outlet structure having openings exposed to a vertically middle part of said passenger compartment; a defrosting duct extending from said downstream portion, said defrosting duct having openings directed to the inner surface of a windshield of the vehicle; a foot area air duct extending from said downstream portion to a lower part of said passenger compartment; a cooling unit installed in said middle portion of said major duct structure; a heating unit installed in said downstream portion of said major duct structure; an air mix door which pivots to control the amount of air directed toward said heating unit; a bypass passage extending from said middle portion just downstream of said cooling unit to an upstream portion of said air outlet structure; and a bypass door pivotally installed in said bypass passage to control the amount of air flowing in said bypass passage, a control system for controlling said air conditioning device, comprising:

a first sensor for issuing a signal representing an ambient temperature;

a second sensor for issuing a signal representing a solar radiation quantity;

a third sensor for issuing a signal representing a temperature of said passenger compartment;

a fourth sensor for issuing a signal representing a temperature of the portion just downstream of said cooling unit;

a fifth sensor for issuing a signal representing an open degree of said air mix door;

a sixth sensor for issuing a signal representing an open degree of said bypass door;

first means for, based on the signals from said first and second sensors, deriving a first temperature of the air drawn out from said defrosting duct;

second means for, based on the signals from said fourth and fifth sensors, deriving a second temperature of the air drawn out from said foot area air duct;

third means for, based on the signal from said fourth sensor, the first temperature and the second temperature, deriving a ratio between the amount of air flowing in said bypass passage and that of the air blown out from said defrosting duct; and fourth means for controlling the open degree of said bypass door in accordance with the derived ratio.

8. A control system as claimed in claim 7, in which said third means derives said ratio (R) by executing the following equation:

$$R=(Tvent/def-Tfoot)/(Tint-Tfoot)$$

wherein:

Tvent/def: derived first temperature

Tfoot: derived second temperature

Tint: temperature sensed by the fourth sensor.

* * * * *